(12) United States Patent
Jenny et al.

(10) Patent No.: US 10,369,952 B2
(45) Date of Patent: Aug. 6, 2019

(54) BACKREST FOR A VEHICLE SEAT AND VEHICLE SEAT WITH THE BACKREST

(71) Applicant: GM GLOBAL TECHNOLOGY OPERATIONS LLC, Detroit, MI (US)

(72) Inventors: Thomas Jenny, Ruesselsheim (DE); Juergen Maier, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 35 days.

(21) Appl. No.: 15/692,946

(22) Filed: Aug. 31, 2017

(65) Prior Publication Data

US 2018/0056916 A1    Mar. 1, 2018

(30) Foreign Application Priority Data

Sep. 1, 2016   (DE) .................. 10 2016 010 530

(51) Int. Cl.
| | |
|---|---|
| *B60N 2/64* | (2006.01) |
| *B60N 2/68* | (2006.01) |
| *B60R 21/00* | (2006.01) |
| *B60R 21/215* | (2011.01) |
| *B60R 21/217* | (2011.01) |
| *B60R 21/2165* | (2011.01) |
| *B60R 21/207* | (2006.01) |

(52) U.S. Cl.
CPC .............. *B60R 21/207* (2013.01); *B60N 2/68* (2013.01); *B60R 21/215* (2013.01); *B60R 21/217* (2013.01); *B60R 21/2165* (2013.01); *B60N 2/64* (2013.01); *B60R 2021/0032* (2013.01); *B60R 2021/2076* (2013.01); *B60R 2021/21537* (2013.01)

(58) Field of Classification Search
None
See application file for complete search history.

(56) References Cited

U.S. PATENT DOCUMENTS

| | | | |
|---|---|---|---|
| 6,450,528 B1* | 9/2002 | Suezawa | B60R 21/207 280/730.2 |
| 7,290,793 B2* | 11/2007 | Tracht | B60R 21/207 280/728.3 |
| 8,123,246 B2* | 2/2012 | Gilbert | B60R 21/207 280/728.2 |
| 2007/0057493 A1 | 3/2007 | Ritzel et al. | |

(Continued)

FOREIGN PATENT DOCUMENTS

| | | |
|---|---|---|
| DE | 20320659 U1 | 5/2005 |
| DE | 102006008168 A1 | 8/2007 |
| WO | 2013141315 A1 | 9/2013 |

*Primary Examiner* — Drew J Brown
(74) *Attorney, Agent, or Firm* — Lorenz & Kopf, LLP

(57) ABSTRACT

A backrest for a vehicle seat having a backrest side rail for supporting a side of a body of an occupant sitting on the vehicle seat, having an airbag and having a gas generator for protecting the occupant, having a hard cover housing for arrangement on the backrest side rail, wherein the hard cover housing in a lateral plan view is designed as a half shell arranged along a longitudinal extent of the backrest side rail with two longitudinal edges spaced from one another, wherein the airbag and the gas generator can be pushed in and/or are pushed in between the two longitudinal edges.

15 Claims, 14 Drawing Sheets

(56) References Cited

U.S. PATENT DOCUMENTS

| | | | |
|---|---|---|---|
| 2008/0203787 A1* | 8/2008 | Tracht | B60N 2/5841 |
| | | | 297/217.1 |
| 2008/0211274 A1* | 9/2008 | Tracht | B60N 2/5816 |
| | | | 297/216.13 |
| 2009/0020988 A1* | 1/2009 | Sato | B60R 21/207 |
| | | | 280/730.2 |
| 2013/0015640 A1* | 1/2013 | Lusk | B60R 21/207 |
| | | | 280/728.2 |
| 2015/0151711 A1* | 6/2015 | Fujiwara | B60R 21/207 |
| | | | 280/728.2 |
| 2015/0353045 A1* | 12/2015 | Sendelbach | B60R 21/207 |
| | | | 280/729 |
| 2016/0152203 A1* | 6/2016 | Wiegelmann | B60R 21/207 |
| | | | 280/730.2 |
| 2016/0167611 A1* | 6/2016 | Fujiwara | B60R 21/207 |
| | | | 297/216.13 |
| 2016/0280175 A1* | 9/2016 | Keer | B60R 21/207 |
| 2017/0015227 A1* | 1/2017 | Tarumi | B60N 2/5841 |
| 2017/0247010 A1* | 8/2017 | Buelow | B60N 2/58 |

* cited by examiner

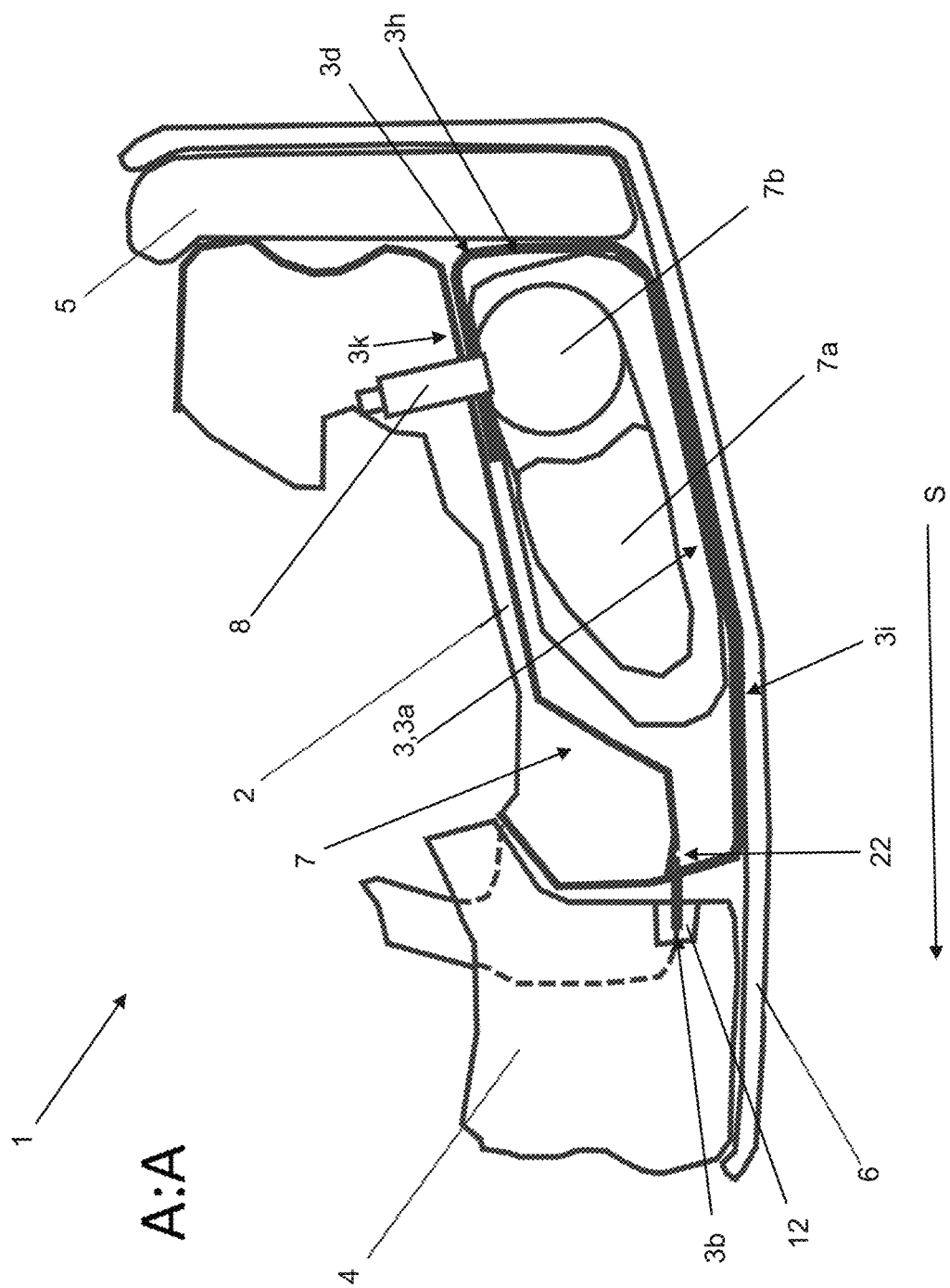

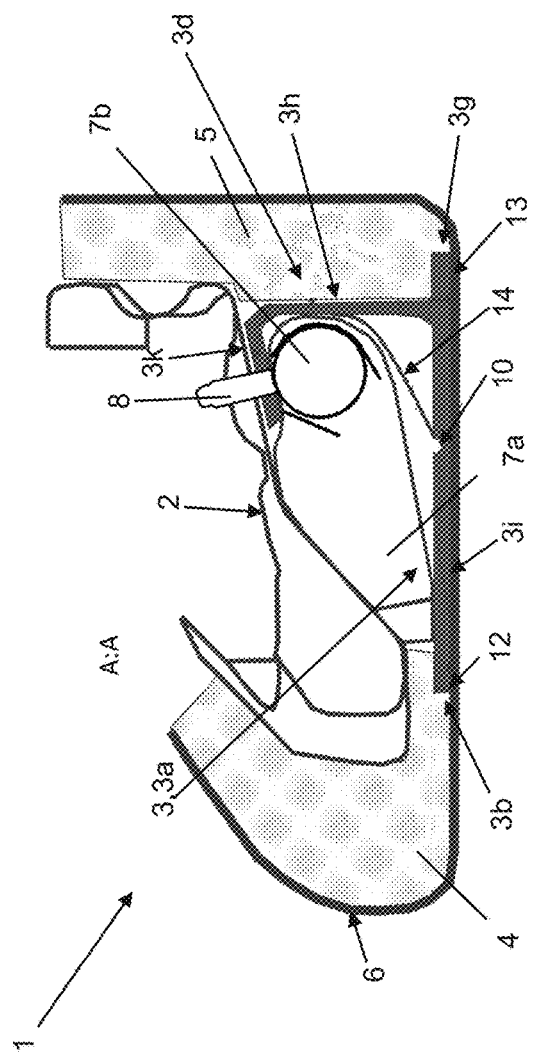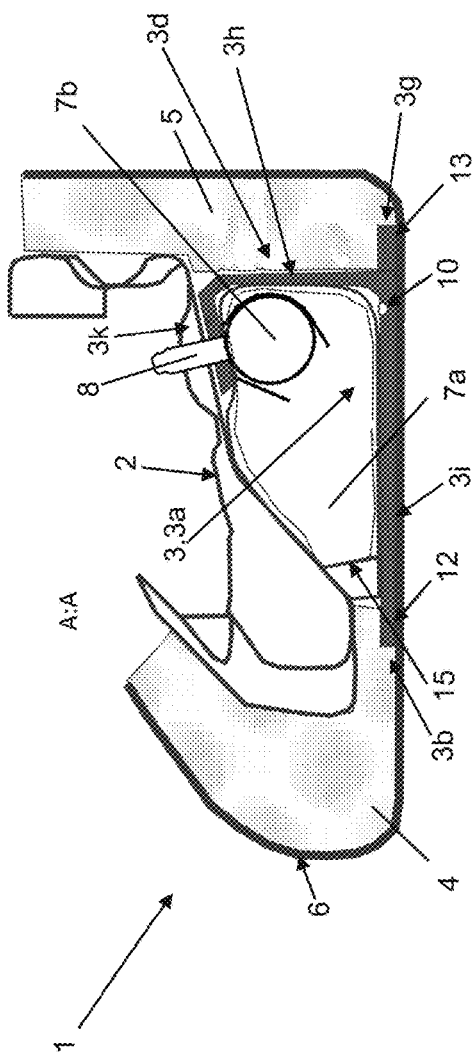

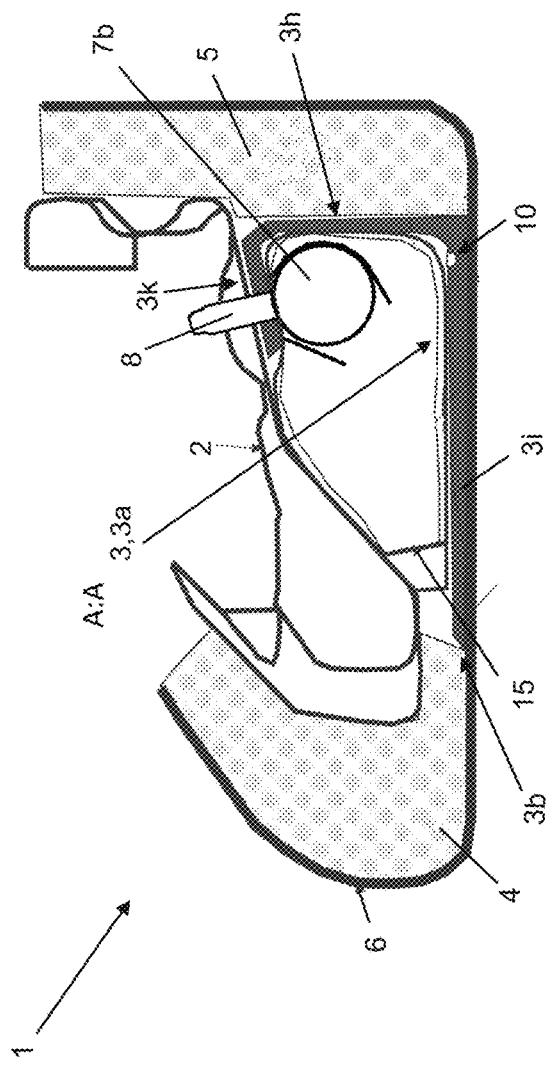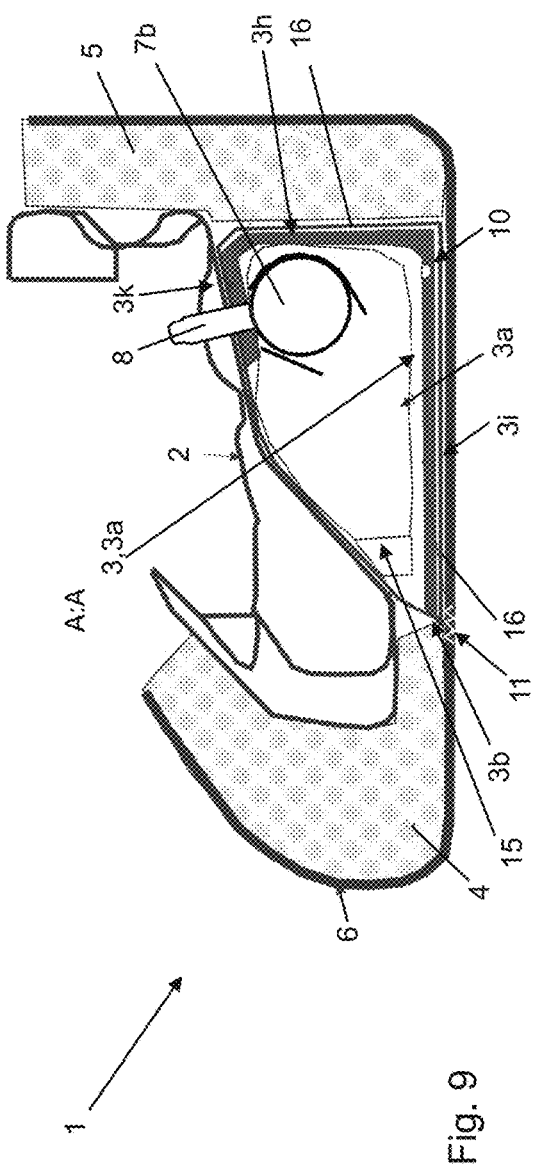

BACKREST FOR A VEHICLE SEAT AND VEHICLE SEAT WITH THE BACKREST

CROSS-REFERENCE TO RELATED APPLICATION

This application claims priority to German Patent Application No. 102016010530.5, filed Sep. 1, 2016, which is incorporated herein by reference in its entirety.

TECHNICAL FIELD

The present disclosure pertains to a backrest for a vehicle seat.

BACKGROUND

A backrest of a vehicle seat generally includes a plastic which may cover an airbag module integrated in the backrest. For example, DE 10 2005 044 012 A1 describes a vehicle seat with a seat part and with a backrest. A side airbag module is integrated into the backrest. The vehicle seat has a backrest shell as load-bearing element. The side airbag module is covered by a cover. Fittings pivotally support the backrest to the seat part. The fitting are attached to the backrest shell with adaptors. The adaptors, together with the airbag module, are covered by the cover on the vehicle seat side. The cover is partly connected to the adaptor and encloses the airbag module at least in sections. The cover has a predetermined breaking point which following a releasing airbag module breaks and enables moveable flap regions to fold about the cover.

SUMMARY

The present disclosure provides a cost-reduced and visually attractive backrest for a vehicle seat. In particular, a backrest for a vehicle seat, for example a driver's seat or front passenger seat, for a seat of a front or rear seat row or for a seat bench of a vehicle is described. Preferably, the vehicle seat is configured as a sports seat and the vehicle is configured as a car or utility vehicle. Exemplary embodiments of the present disclosure are obtained from the following description and/or the attached figures.

The backrest includes a backrest side rail. For example, the backrest side rail is formed from metal as a three-dimensional elongated componentample. Preferably, the backrest side rail adjoins a longitudinal side of the backrest frame of the backrest. Here, the backrest side rail runs along a height of the backrest frame. In particular, the backrest side rail is laterally arranged on the backrest frame and extends from the same forward in a seating direction of the vehicle seat. By way of the backrest side rail, a side of the body of an occupant sitting on the vehicle seat can be supported. For example, the backrest side rail is arranged adjacent and/or equidirectionally to a body section of the vehicle, for example to a vehicle door and/or vehicle pillar when the vehicle seat is integrated in the vehicle.

Preferably, the backrest includes a backrest cover which forms a visible side of the backrest. Optionally, an upholstery foam of the backrest is arranged between the backrest cover and the backrest frame and/or the backrest side rail, so that the occupant can comfortably rest against the backrest.

The backrest includes an airbag module which is designed for protecting an occupant sitting on the vehicle seat. Preferably, the airbag module is designed as a side airbag module for protecting the occupants during an impact of the vehicle, in particular during a lateral impact.

The airbag module includes an airbag and a gas generator as modular components of the airbag module. Optionally, the airbag module can additionally include further modular components for example a diffuser.

The backrest includes a hard cover housing which is arranged on the backrest side rail. Preferably, the hard cover housing is assigned to the airbag module. Optionally, a form and/or contour, in particular an outer contour of the hard cover housing, is adapted to and/or follows a geometry of at least one section of the backrest side rail. The section of the backrest side rail is preferably arranged centrally or substantially centrally in a longitudinal extent of the backrest side rail and preferably takes up at least forty percent, in particular at least 50 percent and/or maximally 90 percent of the longitudinal extent of the backrest side rail. Preferably, a surface contour of the hard cover housing can be designed so that it is formative for the backrest. In particular, an outside surface contour directed towards the body section and/or a backside surface contour directed towards the back is formative for the backrest. Because of this, a uniform and visually attractive outer contour of the backrest can be provided.

For example, the hard cover housing is formed as a plastic component from a ductile plastic, e.g. from polypropylene (PP) and ethylene propylene diene (monomer) rubber (EPDM) or from a thermoplastic elastomer on olefin basis, e.g. TPO. Preferably, the ductile plastic is useable in a temperature range from for example −35 degrees Celsius to +85 degrees Celsius. In an injection molding method, the hard cover housing is easily and cost-effectively producible with the fitting form and/or contour.

It is preferred that the hard cover housing is covered by the backrest cover. By adapting the hard cover housing to the geometry of the section of the backrest side rail and arranging it under the backrest cover the hard cover housing is advantageously inconspicuously and visually attractively integrated in the backrest. Optionally complementarily, the hard cover housing is entirely or partly enclosed by the upholstery foam of the backrest.

In a lateral plan view, the hard cover housing is formed as a half shell arranged along a longitudinal extent of the backrest side rail, in particular of the section of the backrest side rail. Through the design as half shell, hard cover housing in particular is equal to and/or follows the form and/or geometry of the section of the backrest side rail.

The half shell has first and second longitudinal edges, which are arranged spaced from one another. Preferably, the longitudinal edges extend along the longitudinal extent of the backrest side rail from the top down. For example, the first longitudinal edge is directed in a seating direction of the vehicle seat towards the front. It is possible that the first longitudinal edge is followed by a wall section, which is directed to a lean-back surface of the backrest. The airbag and the gas generator can be pushed in and/or are pushed in between the two longitudinal edges.

In a possible design implementation of the present disclosure, the half shell includes an outer region which follows the first longitudinal edge against the seating direction towards the back. Preferably, the outer region is directed to the body section of the vehicle when the vehicle seat with the backrest is integrated in the vehicle.

In a preferred design configuration of the present disclosure, the half shell has a profile wall. In particular, the profile wall includes the second longitudinal edge and/or leads into the same. For example, the profile wall is formed substantially U-shaped or L-shaped in cross section. Because of this, the airbag and the gas generator are preferably surrounded by the profile wall at least in section, when they are pushed in between the two longitudinal edges. In particular, the airbag and the gas generator are arranged between the profile wall and the backrest side rail. Preferably, the half shell covers the airbag module on the cover side. Thus, the airbag module can be securely protected against a force effect from the outside.

Within the scope of the present disclosure it is possible that the airbag is thermally pressed as a so-called package. In particular, the package can be pressed into the half shell, in particular into the profile wall. Because of this, the airbag package is reduced in its volume and can be installation space-savingly integrated in the backrest.

It is advantageous that in the region of the airbag a defined outer contour of the backrest with reduced material and/or cost expenditure can be provided by the hard cover housing. In particular, a cost-effective and precise backrest outer contour can be created in particular in the region of the integrated airbag.

For example, the profile wall follows the outer region of the half shell against the seating direction towards the back. Preferably, the profile wall has a back outer surface which is directed against the seating direction towards the back. Optionally complementarily, the profile wall includes a region that is directed to the backrest side rail, which region is arranged adjacent to the second longitudinal edge.

Preferably, the half shell has a first face edge and a second face edge. For example, the first face edge is directed along the longitudinal extent of the backrest side rail towards the top, wherein the top is where a head of the occupant on the vehicle seat is located when said occupant leans against the backrest. The second front edge is preferably directed downwards.

Preferably, the two front edges are designed wall-free and/or open. However, it is particularly preferred that at least one of the front edges is at least partly closed. In this case, the half shell has at least one front face, which at least partly closes the at least one corresponding front edge. This particularly preferred configuration is preferably combined with a tear-open seam integrated in the half shell, along which the half shell can tear open upon and/or after an activation of the gas generator, so that an opening for the inflating airbag can be formed. Through the closed design of the at least one front face, an unfurling direction of the airbag can be more pronouncedly predetermined by the half shell. In addition, an intrinsic stiffness of the half shell can be increased because of this.

In a preferred embodiment of the present disclosure, the airbag module includes the hard cover housing. Preferably, the hard cover housing and the airbag module form a preassembled unit which is formed as a so-called hard cover-airbag module and attached to the backrest side rail. Because of this, the airbag module is formed as a so-called hard cover-airbag module. In particular, the hard cover housing and the airbag module are first joined to form a unit and subsequently attached to the backrest side rail as the unit.

Preferably, the airbag module includes a fabric cover. The fabric cover can be designed in particular as a textile cover for example of a felt or polyester material. Optionally, the fabric cover has a tear-open line along which the fabric cover tears open upon and/or after the activation of the gas generator, so that the airbag can inflate.

Particularly preferably, the airbag module is arranged in the fabric cover jointly with the hard cover housing. In particular, the airbag module and the hard cover housing are jointly attached in the fabric cover to the backrest side rail. Preferably, the fabric cover serves for the mutual fixing of the airbag module and the hard cover housing.

Alternatively or optionally complementarily, the hard cover housing and the airbag module with the fabric cover can be integrated in a fabric unfurling duct of the backrest cover. In particular, the fabric unfurling duct is sewn with a tear-open seam of the backrest cover. Because of this, the fabric unfurling duct is jointly torn open with the cover upon and/or after the activation of the gas generator.

In an alternative configuration of the present disclosure, the modular components of the airbag module are arranged in the fabric cover. In this configuration, the airbag module is preferably designed as a soft cover airbag module. In particular, the hard cover housing is first attached to the backrest side rail. Following this, the modular components surrounded by the fabric cover are pushed in between the longitudinal edges of the half shell. In this case, the hard cover airbag module forms a trim component for the airbag module which protects the modular components against an external force effect.

Optionally complementarily, the airbag module includes an ignition connector for igniting the gas generator. Preferably, the ignition connector is arranged on or in the half shell, in particular within the profile wall. Alternatively, the ignition connector can also be arranged outside the half shell where it can be surrounded for example by the upholstery foam. It is likewise possible that the ignition plug is at least partly surrounded by a wall injection molded to the half shell, so that the ignition connector is adequately protected from an external force effect.

Within the scope of the present disclosure, it is particularly preferred that the half cover housing is attached to the backrest side rail. Preferably, the hard cover housing is attached to the backrest side rail by way of at least one fastening means of the airbag module. For example, the at least one fastening means is formed as at least one pin of the gas generator and/or as at least one metal holder of the airbag module.

Optionally, the hard cover housing has at least one hole which is formed for passing through the at least one fastening means. For example, the at least one hoe is arranged in the profile wall of the half shell. In particular, the at least one hole is arranged in the region of the profile wall facing the backrest side rail. Because of this, the attaching of the hard cover housing can be solved easily and cost-effectively jointly with the attaching of the airbag module. In particular, separate fastening means can be omitted and costs reduced because of this.

For example, two or more holes are introduced into the profile wall. Because of this, the half shell can receive different airbag module versions. In particular, a joint attaching of the half shell and the corresponding version of the airbag module can be flexibly ensured in the backrest. Specifically, different embodiments and sizes of different airbag modules can be arranged in the profile wall and attached to the backrest side rail jointly with the hard cover housing.

Alternatively it is possible that the hard cover housing is attached to the backrest side rail separately to the airbag module, in particular to the backside of the backrest side rail. In particular, the hard cover housing is connected to the backrest side rail on or along the second longitudinal edge in a form-fit and/or force-fit manner for example via a screw, rivet, clamping or latching connection. In this case, the profile wall can be less pronounced or be even omitted entirely, since for example the at least one hole in the wall can be omitted. Then, the half shell has the substantially L-shaped cross section.

In a preferred configuration of the present disclosure, the hard cover housing has at least one hinge and/or weakened line. For example, the at least one hinge and/or weakened line is formed by at least one local wall thickness reduction of the hard cover housing. For example, the hinge and/or weakened line run in the longitudinal extent of the hard cover housing from the top down. Preferably, the hard cover housing is subdivided into at least two regions by the at least one hinge and/or weakened line. In particular, at least one of the regions can fold about the at least one hinge and/or weakened line. Preferably, at least one of the regions folds about the at least one hinge and/or weakened line upon and/or after the activation of the gas generator, so that the same can form the opening for the airbag being inflated. For example, a first hinge and/or weakened line runs in the outer region adjacent to the profile wall and a second hinge and/or weakened line in the outer region adjacent to the first longitudinal edge.

In a preferred design configuration of the present disclosure, the hard cover housing can consists of two contiguous in particular not geometrically identical halves. Preferably, the halves are subdivided and/or formed by the at least one hinge and/or weakened line. In particular, the hard cover housing, specifically the halves, can be folded open and closed along the at least one hinge and/or weakened line. In particular, the halves are foldable along the at least one hinge and/or weakened line. Because of this, the hard cover housing can be more easily integrated into the backrest. In particular, the hard cover housing is folded into its final position only during the integration in the backrest. In this case, the hard cover housing can have at least one latching device via which the folded halves are latched and/or can be latched in the final position. For example, the at least one latching device is arranged on the first and/or second front edge and in the transition to the outer region of the half shell. Preferably, the hard cover housing receives its final contour and/or form of the half shell by the folding and by the latching of the two halves.

It is likewise possible within the scope of the present disclosure that the hard cover housing has a ribbing, in particular hinge ribs. Preferably, the ribbing is attached to an inside of the profile wall, in particular on the inside of the region directed towards the backrest side rail. In particular, the ribbing is pronounced in the rear region of the half shell, in particular about the gas generator, since this part should not preferably hinge and/or should be stiff. Through the ribbing, a stiffness of the hard cover housing can be increased.

A possible design implementation of the present disclosure provides that the hard cover housing is connected to the backrest side rail on and/or along the first longitudinal edge in a form-fit manner. For example, the hard cover housing is connected to the backrest side rail on and/or along the first longitudinal edge by way of a latching and/or clamping device. Because of this, an unattractive projecting of the outer region and/or of the profile wall of the half shell can be avoided. Preferably, the form-fit connection between the hard cover housing and the backrest side rail is disconnected automatically upon and/or after the activation of the gas generator, so that the opening for the airbag being inflated is formed.

Alternatively or optionally complementarily it is possible within the scope of the present disclosure that the hard cover housing is connected to the backrest side rail in a marginal region of the first longitudinal edge and/or adjacent to the first longitudinal edge. Because of this, a secure attaching of the hard cover housing can be achieved and the unattractive projecting avoided. Preferably, the hard cover housing has a tear-open line in the marginal region or adjacent to the same, along which the hard cover housing can tear open. In particular, the hard cover housing tears open along the tear-open line upon and/or after the activation of the gas generator, so that the folding of the at least one region about the at least one hinge and/or weakened line and the forming of the opening for the airbag being inflated is ensured.

In a possible implementation of the present disclosure, the first longitudinal edge is sewn to the backrest cover. Optionally, the cover there has a tear-open seam on which it can tear open upon and/or after the activation of the airbag module. Preferably, the backrest cover is arranged on the backrest together with the half shell sewn thereon. In particular, the airbag module with the fabric cover is integrated into the profile wall of the half shell only during the cover assembly in this case.

A preferred design configuration of the present disclosure provides that the backrest side rail in a plan view from the front has a first and second lateral backrest side rail margin. For example, the first and second backrest side rail margin run along the longitudinal extent of the backrest side rail. Preferably, the first backrest side rail margin is overfoamed with a first upholstery foam section of the upholstery foam and the second backrest side rail margin with a second upholstery foam section of the upholstery foam.

In a preferred design implementation of the present disclosure, the hard cover housing in the plan view onto the outer region is arranged between the first and second upholstery foam section. In particular, at least the first upholstery foam section has a mounting for the first longitudinal edge of the hard cover housing. The mounting can be integrated in the first upholstery foam section so that it is arranged in the upholstery foam section located inside. This means that the mounting towards the backrest side rail and towards the backrest cover is delimited by the upholstery foam. In particular, the first longitudinal edge of the hard cover housing towards the backrest side rail and on the cover side arranged in the mounting is surrounded by the upholstery foam section. Optionally, the first longitudinal edge can be arranged and/or held in the mounting in a form-fit and/or force-fit manner. Upon and/or after the activation of the gas generator, the form-fit and/or force-fit arrangement of the first longitudinal edge in the mounting can disconnect and thus make possible the folding of the at least one region about the at least one hinge and/or weakened line.

Alternatively it is possible that the mounting located outside is integrated in the first upholstery foam section. In this case, the mounting is only delimited by the upholstery foam towards the backrest side rail whereas it is open on the cover side. This means that the first longitudinal edge of the hard cover housing towards the backrest side rail lies on the upholstery foam section and is upholstery foam-free on the cover side and only covered by the backrest cover. Through the arrangement in the mounting located inside or located outside, the first longitudinal edge of the hard cover housing is stowed so that it does not unattractively project in the direction of the backrest cover. Particularly preferred within the scope of the present disclosure is that the hard cover housing, in particular between the first and second upholstery foam section, is arranged tensioned and/or held in a force-fit manner. Optionally, the hard cover housing arranged tensioned elastically deforms about the at least one hinge and/or weakened line. Through the tensioned arrangement of the hard cover housing it can be advantageously achieved that the hard cover housing presses the airbag against the backrest side rail. Because of this, a functional, installation space-saving and visually attractive backrest side rail outer contour can be achieved.

When on the front sides the at least one front face is arranged and/or on the first longitudinal edge the additional wall section and/or when the half shell has the ribbing, the arrangement of the half shell in a tensioned manner between the upholstery foam sections can be omitted. In particular, the half shell itself has adequate intrinsic tension because of the walls and/or the ribbing in order to press the airbag module against the backrest side rail.

BRIEF DESCRIPTION OF THE DRAWINGS

The present disclosure will hereinafter be described in conjunction with the following drawing figures, wherein like numerals denote like elements.

FIG. 5 shows a cross section through the backrest from FIG. 1 along the section line A-A with a first version of the hard cover housing;

FIGS. 6, 7 show the cross section from FIG. 5 in a second and third version;

FIGS. 8, 9 show the cross section from FIGS. 5 to 7 in a fourth and fifth version;

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
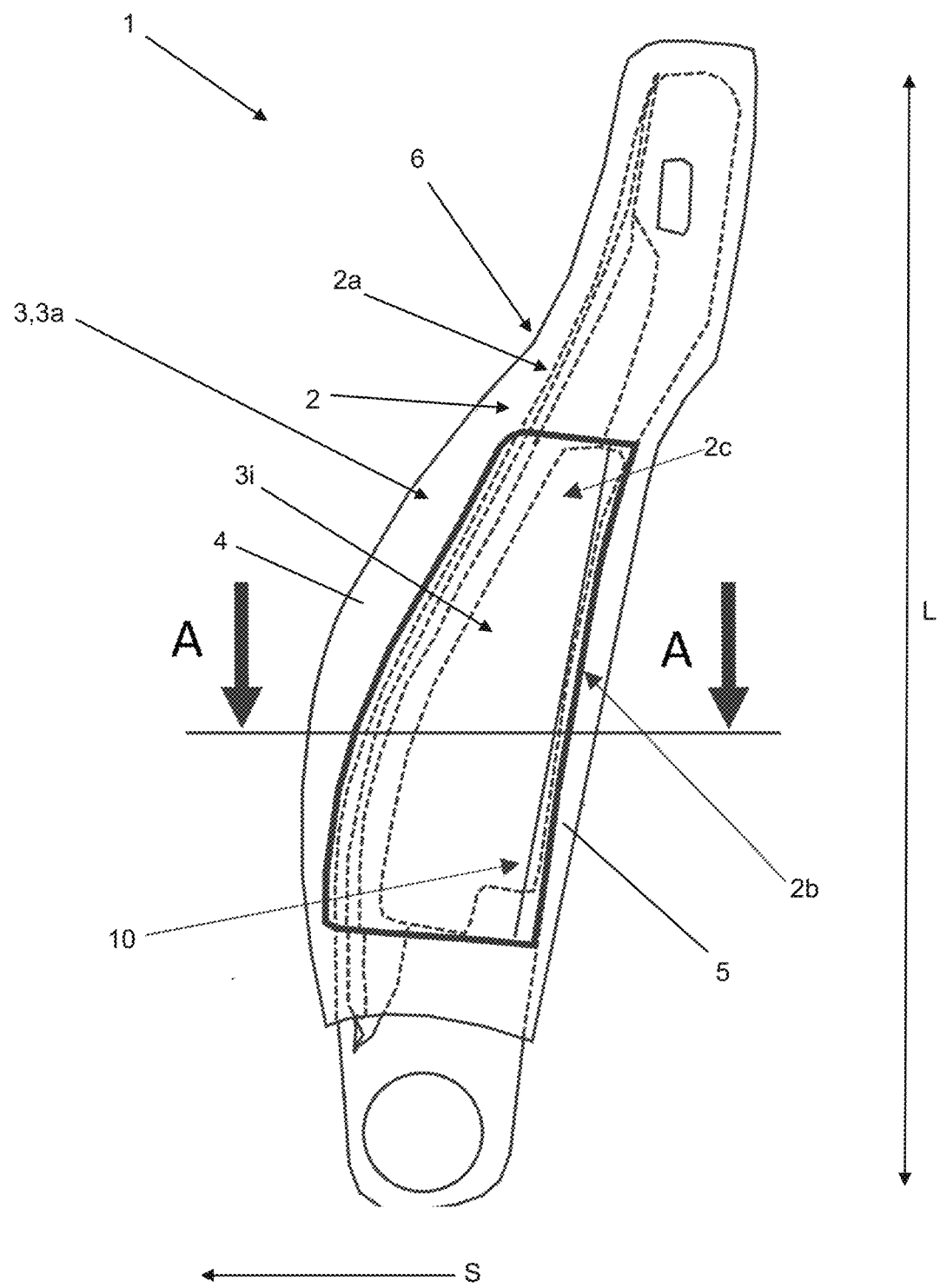
FIG. 1 shows a longitudinal section through a backrest for a vehicle seat.

FIG. 1 shows a longitudinal section through a backrest 1 for a vehicle seat, for example a driver's seat or front passenger seat and/or for a seat of a front or rear seat row of a vehicle, in particular of a car, utility vehicle or of a public transport means.

Figure 3:
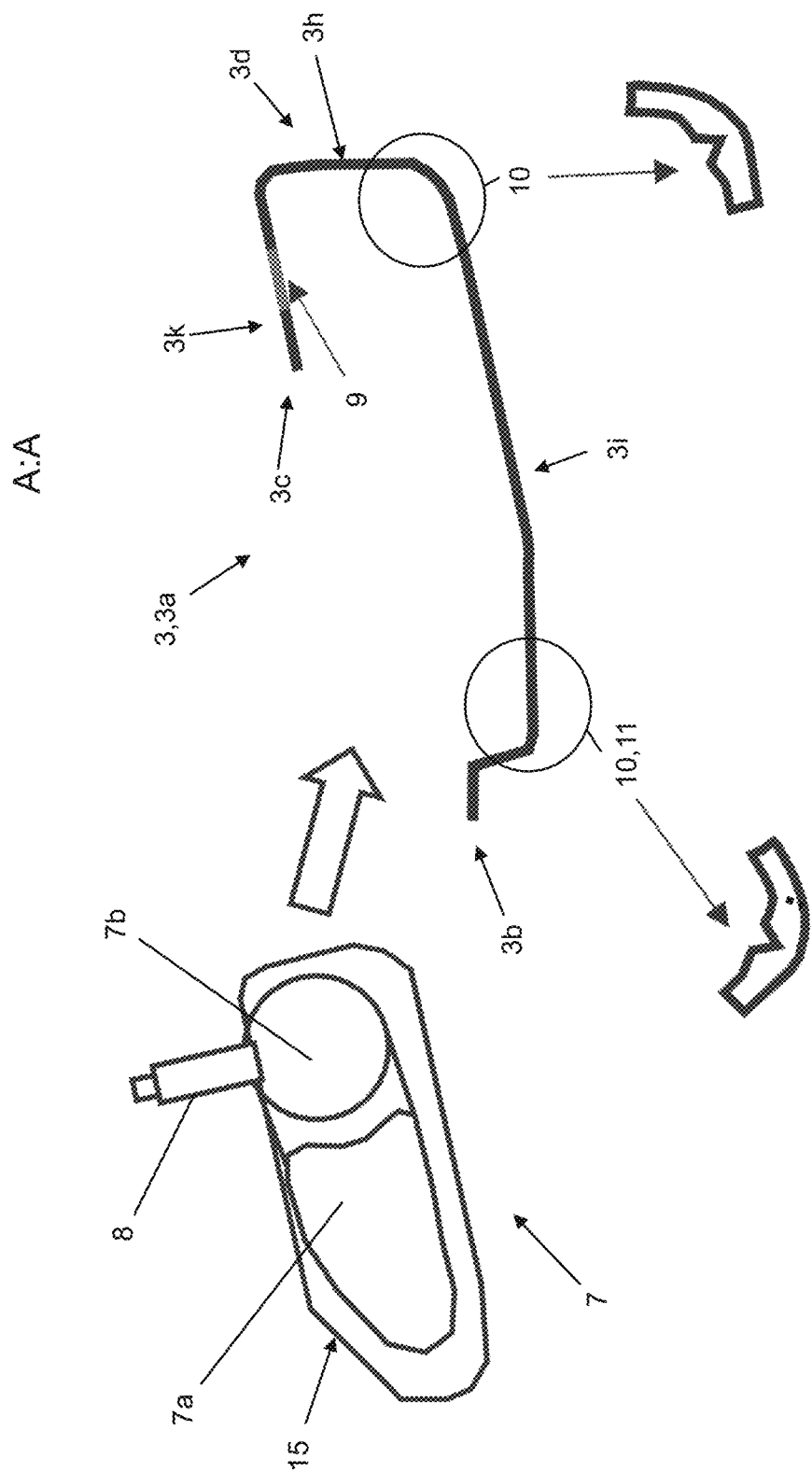
FIG. 3 shows a cross section through the hard cover housing from FIG. 1 along the section line A-A and an airbag module that can be arranged on the hard cover housing.

The backrest 1 includes a backrest side rail 2, a hard cover housing 3 and an upholstery foam with a first upholstery foam section 4 and with a second upholstery foam section 5, a backrest cover 6, and an airbag module 7 (FIG. 3). The airbag module 7 has an airbag 7a and a gas generator 7b, which form modular components 7a, 7b of the airbag module 7. Optionally, the airbag module 7 can additionally include at least one further module component, for example a diffuser.

The backrest side rail 2 adjoins a backrest frame of the backrest 1 which is not shown on a narrow side of the backrest 1, which forms an inner structure of a lean-back surface of the backrest 1. The backrest side rail 2 runs in its longitudinal extent L along a height of the backrest frame. It is arranged on a narrow side of the backrest 1, which is directed towards a body section of the vehicle (not shown), in which the vehicle seat is arranged. The body section can for example be a vehicle door or a vehicle pillar. The backrest side rail 2 extends in a seating direction S of the vehicle seat towards the front and thus protrudes laterally from the lean-back surface of the backrest 1, so that a side of a body of the occupant sitting on the vehicle seat can be supported by the backrest side rail 2.

The backrest side rail 2 is formed as a three-dimensional elongated component. It includes a first backrest side rail margin 2a, which is directed towards the front in seating direction S. A second backrest side rail margin 2b is directed towards the back in opposite direction. The backrest side rail 2 includes a section 2c on which the airbag module 7 is arranged. The section 2c of the backrest side rail 2 is substantially arranged centrally in a longitudinal extent L of the backrest side rail 2. Its proportion amounts to at least forty percent in particular at least 50 percent and/or maximally 90 percent of the longitudinal extent L.

The backrest 1 is overfoamed by the upholstery foam in order to make it possible for the occupant to comfortably lean against. The backrest side rail 2 is overfoamed by the first upholstery foam section 4 in a first direction which is directed towards the front in particular in seating direction S and towards the back overfoamed in opposite direction by the second upholstery foam section 5. The backrest cover 6 is arranged on the upholstery foam and covers the same so that it forms a visible side of the backrest. Because of this, the backrest cover 1 can be designed in a visually and haptically attractive manner.

The hard cover housing 3 is arranged on the backrest side rail 2. In particular, the hard cover housing 3 is arranged in the section 2c of the backrest side rail 2 on which the modular components 7a, 7b are positioned. These are arranged between the section 2c of the backrest side rail 2 and the hard cover housing 3.

The hard cover housing 3 is formed as a flat plastic part consisting of a ductile plastic such as for example PP and EPDM or TPO. The hard cover housing 3 in its form and/or contour, in particular in its outer contour, is matched to the geometry of the section 2c of the backrest side rail 2 and/or follows the same. It is covered by the backrest cover 6 so that it is integrated in the backrest 1 in a visually attractive manner.

Figure 2:
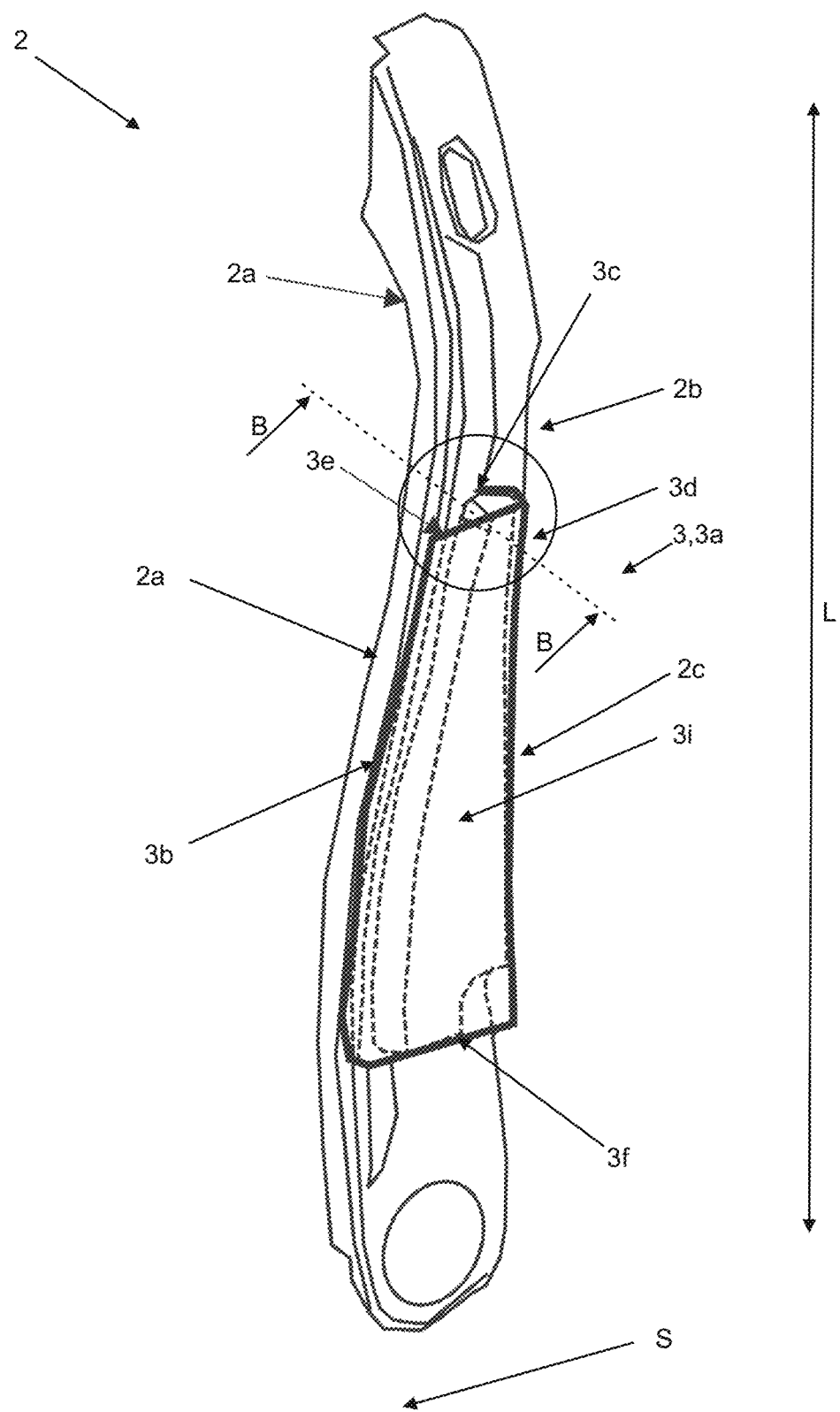
FIG. 2 shows a lateral perspective view of a backrest side rail and of a hard cover housing of the backrest from FIG. 1.

FIG. 2 shows the backrest side rail 2 and the hard cover housing 3 in a perspective lateral view. The hard cover housing 3 is designed as a half shell 3a with a first longitudinal edge 3b directed towards the front in seating direction S and with a second longitudinal edge 3c directed towards the back. The two longitudinal edges 3b, 3c are arranged spaced from one another. Because of this, the modular components 7a, 7b can be pushed in between the two longitudinal edges 3b, 3c and be mounted to the backrest side rail 2. For this purpose, the backrest 7a can also be pneumatically compressed as a package so that it is of a more compact form and can be more easily pushed in.

The half shell 3a has a profile wall 3d, which includes the second longitudinal edge 3c and/or leads into the same. The airbag 7a and the gas generator 7b (FIG. 3) are surrounded by the profile wall 3d at least in sections.

The half shell 3a has a first front edge 3e, which in the image plane is directed towards the top and a second front edge 3f, which in the image plane is directed towards the bottom. According to FIG. 2, the first longitudinal edge 3b is designed open and has no wall section. The two front edges 3e, 3f are likewise designed open; in particular, they have no front faces 23.

Figure 16:
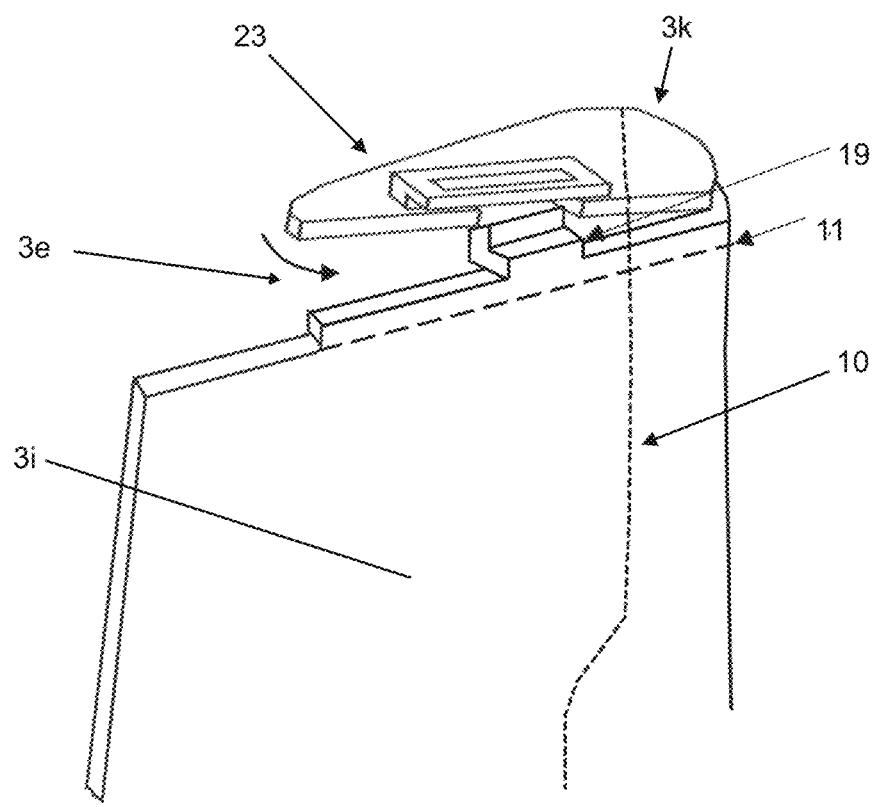
FIG. 16 shows a perspective view of the first front edge and of the outer region of the hard cover housing with a latching device.

In order to increase a stiffness of the half shell 3a, at least one of the front edges 3e, 3f can have the front face 23 and/or the first longitudinal edge 3b the wall section in an alternative exemplary embodiment (FIG. 16). In this case, at least one of the front edges 3e, 3f and/or the first longitudinal edge 3b are designed at least partly closed.

Between the first longitudinal edge 3b and the profile wall 3d an outer region 3i of the hard cover housing 3 is arranged. The same is directed towards the body section when the backrest 1 is mounted on the vehicle seat and the same is integrated in the vehicle.

The first longitudinal edge 3b runs along the first backrest side rail edge 2a. A surface contour and/or outer contour of the half shell 3a is adapted in its geometry and in its course to the geometry and the course of the section 2c of the backrest side rail 2. Because of this, a precise backrest outer contour can be created. In the FIGS. 3 to 4e, cross sections of the hard cover housing 3 and of the airbag module 7 along the section line A-A from FIG. 1 are shown.

FIG. 3 shows that the airbag module 7 includes the airbag 7a, the gas generator 7b and a fabric cover 15. The fabric cover 15 is formed for example from a textile material, for example from a felt or polyester. In this case, the airbag module 7 is formed as a so-called soft cover airbag module. The airbag 7a and the gas generator 7b are jointly arranged in the fabric cover 15 and enclosed by the same. In this enclosed state, they are pushed in between the two longitudinal edges 3b, 3c (FIG. 2) of the half shell 3a, which is already attached to the backrest side rail 2. Because of this, the airbag module 7 is arranged between the section 2c of the backrest side rail 2 and the hard cover housing 3. The airbag module 7 is arranged within the profile wall 3d so that it is at least partly surrounded by the same. Because of this, the hard cover housing 3 in the assembled state on the backrest side rail 2 functions as a trim component for the airbag module 7.

In an alternative exemplary embodiment, the airbag module 7 can include the hard cover housing 3. In particular, the airbag module 7 and the hard cover housing 3 in this case form a preassembled unit. The preassembled unit is attached to the backrest side rail. Because of this, the airbag module 7 is formed as a so-called hard cover airbag module.

The gas generator 7b has a fastening means for fastening to the backrest side rail 2. The fastening means is formed as a pin 8 for the form-fit and/or force-fit connecting to the backrest side rail 2.

The profile wall 3d has a hole 9 for the pin 8 of the gas generator 7b. The pin 8 can be passed through the hole 9 so that the hard cover housing 3 can be attached to the backrest side rail 2 jointly with the airbag module 7.

An ignition connector of the gas generator 7b which is not shown is arranged on or in the half shell 3a, in particular within the profile wall 3d. Alternatively, the ignition connector can also be arranged outside the half shell 3a, for example be surrounded by one of the upholstery foam sections 4, 5. Alternatively, the ignition connector can be at least partly surrounded by a wall molded onto the half shell 3a, which protects the ignition connector.

The hard cover housing 3 has a hinge and/or weakened line 10 formed by a local reduction in wall thickness. The hinge and/or weakened line 10 is arranged between the outer region 3i and the profile wall 3d. The hinge and/or weakened line 10 is orientated vertically and runs from the top down. Along the hinge and/or weakened line 10, the outer region 3i can fold relative to the profile wall 3d in order to be able to form an opening for the airbag 7 being inflated upon and/or after an activation of the airbag module 7, for example due to an impact of the vehicle.

Optionally complementarily, the hard cover housing 3 can have at least one further vertically orientated hinge and/or weakened line which makes possible a folding of a further region of the hard cover housing 3. The at least one further hinge and/or weakened line can be arranged in the outer region 3i, in particular adjacent to the first longitudinal edge 3b.

Figure 4A:
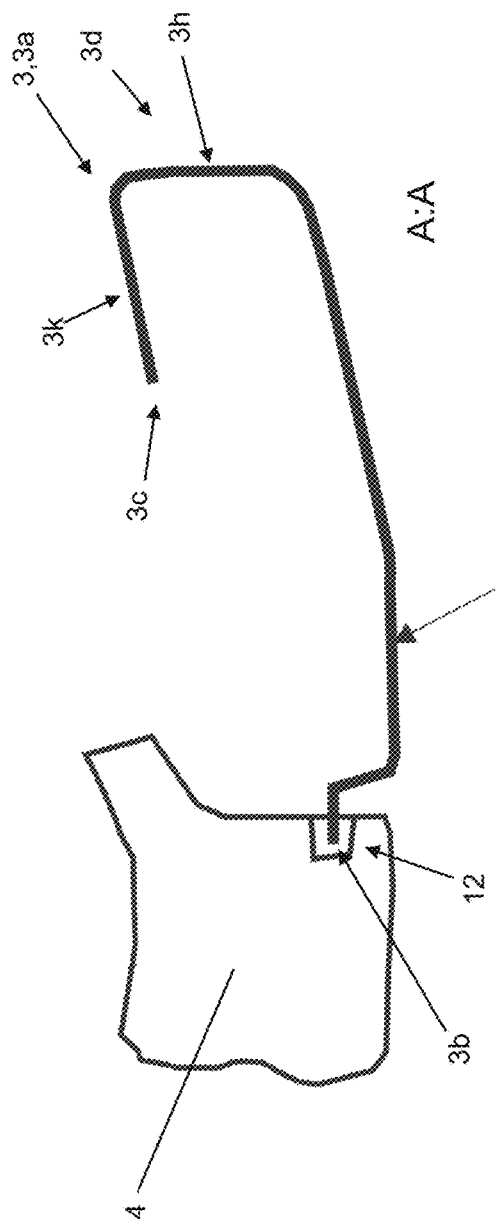
FIGS. 4a, 4b show an arrangement of a longitudinal edge of the hard cover housing from FIG. 3 in a recess of an upholstery foam section of the backrest from FIG. 1.

As shown in FIG. 4a, the first upholstery foam section 4 shows the mounting 12 for the first longitudinal edge 3b of the hard cover housing 3. The mounting 12 is arranged located inside in the upholstery foam section 4. This means that the upholstery foam is arranged in the image plane above and under the first longitudinal edge arranged in the mounting 12. In particular, the first longitudinal edge 3a is surrounded all round by the upholstery foam. Between the longitudinal edge 3b and the backrest cover 6 (FIG. 1) arranged on the upholstery foam section 4, upholstery foam is arranged.

The first longitudinal edge 3b is held in the mounting 12 in a form-fit manner. Upon and/or after the activation of the airbag module 7, the first longitudinal edge 3b is dislodged from the mounting 12 because of the acting forces so that the at least one region of the half shell 3a can fold about the hinge and/or weakened line 10 (FIG. 3).

Figure 4B:
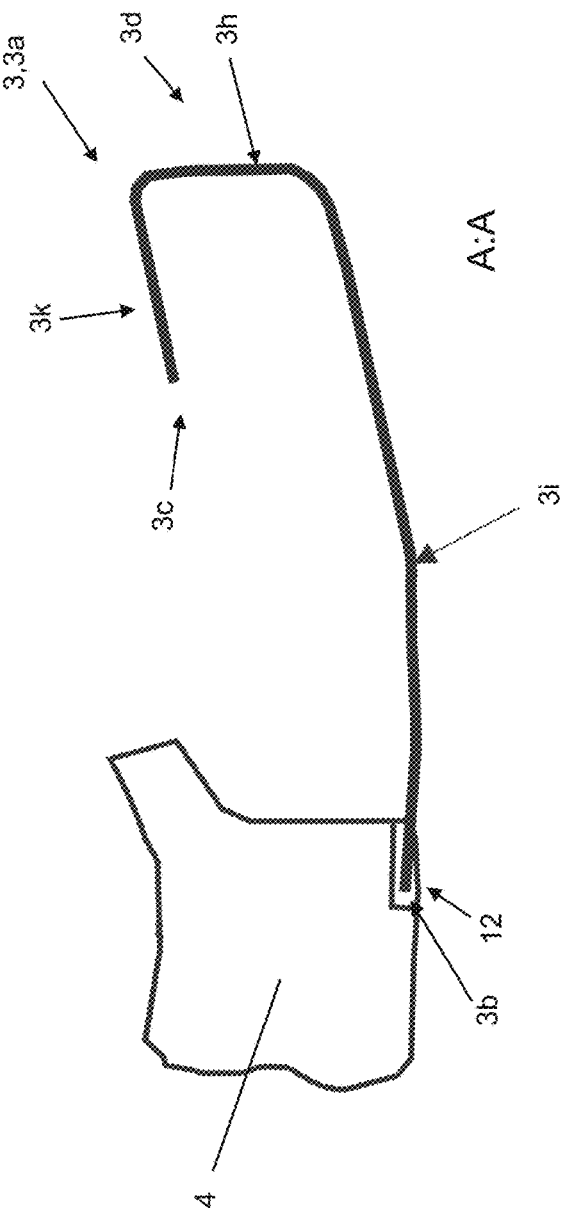

As is shown in FIG. 4b, the mounting 12 is alternatively arranged located outside in the first upholstery foam section 4. Located outside means that the upholstery foam on the image plane is arranged above the first longitudinal edge 3a and only the backrest cover 6 runs under the first longitudinal edge 3b. Thus, the first longitudinal edge 3a contacts the backrest cover 6 when it is arranged in the mounting 12.

Figure 4C:
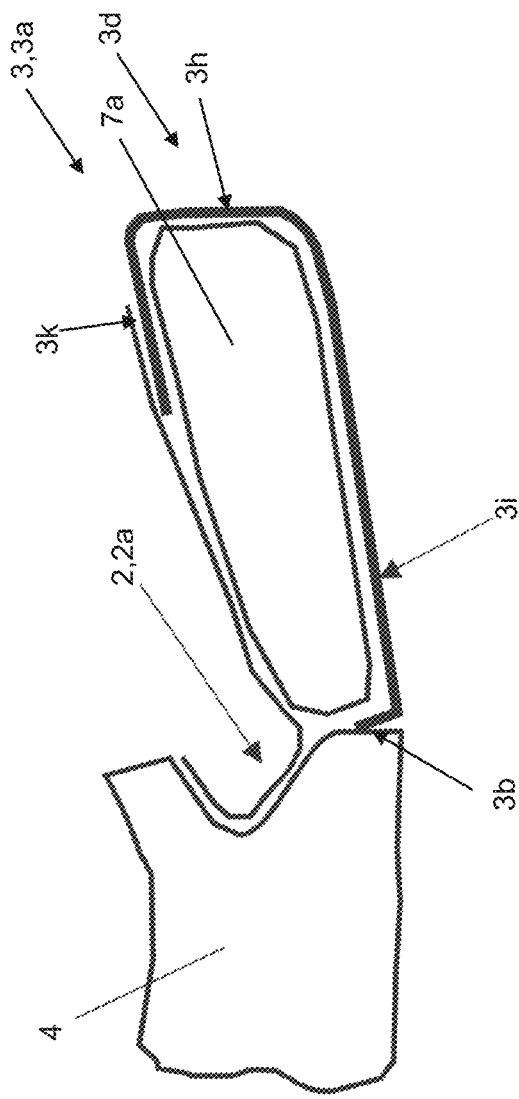
FIGS. 4c, 4d, 4e show alternative arrangements of the longitudinal edge of the hard cover housing to the FIGS. 4a, 4b.
Figure 4D:
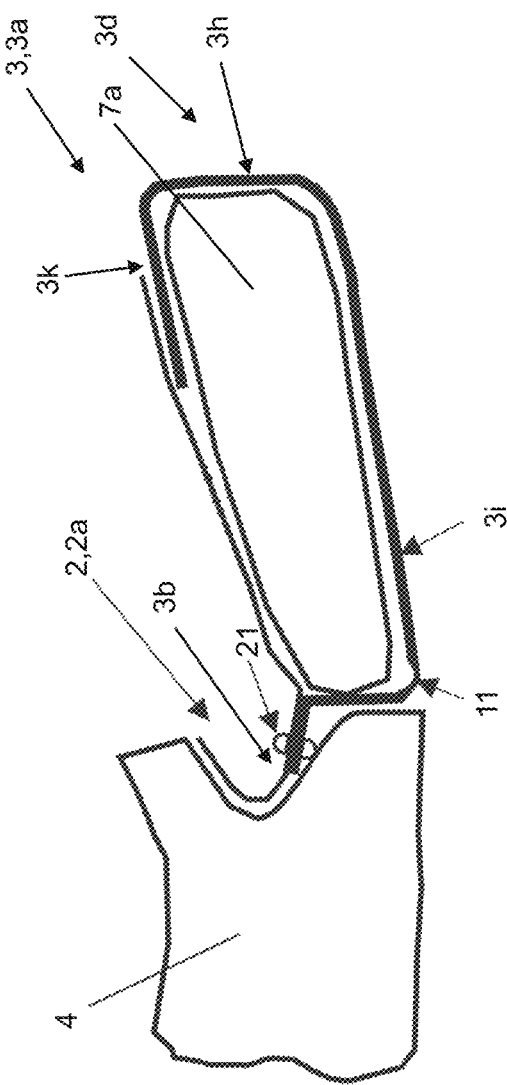
Figure 4E:
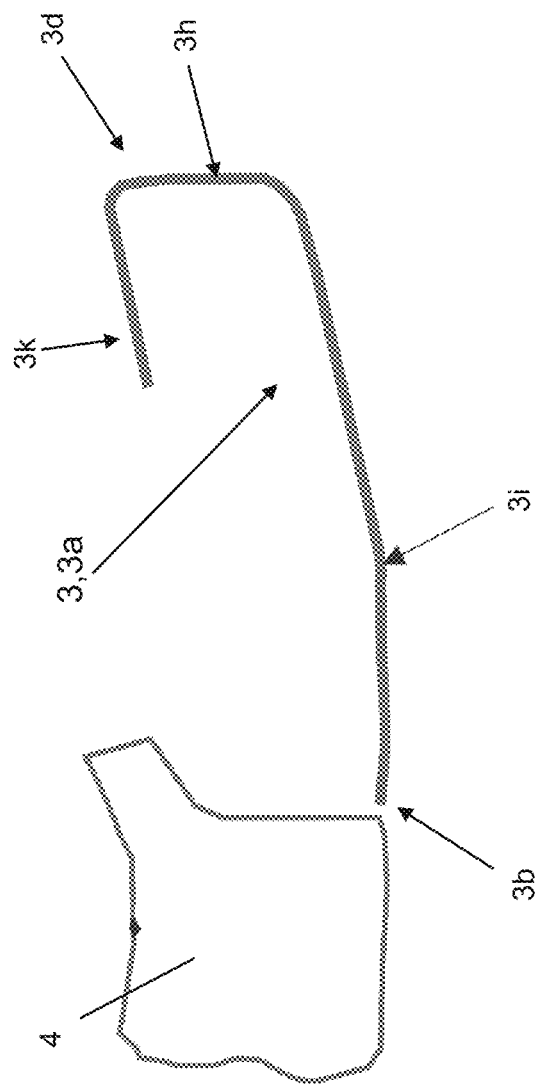

The FIGS. 4c-4e show alternative arrangements of the first longitudinal edge 3b of the hard cover housing 3 relative to the first upholstery foam section 4. The first upholstery foam section 4 has no mounting 12 for the first longitudinal edge 3b.

According to the FIG. 4c, the first longitudinal edge 3b is inserted between the airbag 7 and the first upholstery foam section 4. According to FIG. 4e, the first longitudinal edge 3b of the hard cover housing 3 adjoins the first upholstery foam section 4 and/or is arranged adjacent to the same. Upon and/or after the activation of the airbag module 7, the first longitudinal edge 3*b* can be dislodged through the acting forces.

In FIG. 4*d*, the first longitudinal edge 3*b* is attached to the front backrest side rail margin 2*a*. The attachment is solved by way of a rivet, screw, clamping or latching connection. Adjacent to the connection, a tear-open pin 21 is present, which ensures that the connection tears open upon and/or after the activation of the gas generator 7*b*. Alternatively or optionally complementarily, the hard cover housing 3 can have a tear-open line 22 (FIG. 5) in this region.

FIG. 5 shows a cross section A-A through the backrest 1 from FIG. 1. The first longitudinal edge 3*b* is arranged in the mounting 12 located inside. In a region 3*k* of the profile wall 3*d* directed towards the backrest side rail 2 the hard cover housing 3 is connected to the backrest side rail 2 via the pin 9 of the airbag module 7. Additionally, the hard cover housing 3 is connected to the backrest side rail 2 via a further fastening means such as for example a rivet, a screw, a latching and/or clamping device. There, the hard cover housing 3 has the tear-open line 22 along which the hard cover housing 3 upon and/or after the activation of the gas generator 7*b* can tear open and thus make possible the folding about the hinge and/or weakened line 10. The second upholstery foam section 5 adjoins a back outer surface 3*h* of the profile wall 7*b* of the hard cover housing 3.

FIGS. 6 and 7 show a first and second version of the cross section A-A through the backrest 1 from FIG. 5. The hard cover housing 3 has a circumferential margin with the first longitudinal edge 3*b* and with a complementary longitudinal edge 3*g*. The circumferential margin overlaps the first and second upholstery foam section 4, 5 and/or lies on the same. In particular, the first longitudinal edge 3*b* is arranged in the mounting 12 located outside of the first upholstery foam section 4. The complementary longitudinal edge 3*g* is arranged in a further mounting 13 located outside of a second upholstery foam section 5. Because of this, the wall thickness of the circumferential margin can be offset.

Between the two longitudinal edges 3*b*, 3*g* the hinge and/or weakened line 10 is arranged in the outer region 3*i*, about which the at least one region of the hard cover housing 3 can fold upon and/or after the activation of the airbag module 7. The second upholstery foam section 5 lies against the back outer surface 3*h* of the profile wall 3*d*.

According to FIG. 6, the half shell 3*a* has hinge ribs 14 for stiffening. The hinge ribs 14 are arranged in the profile wall 3*d* on the inside. The hinge and/or weakened line 10 is arranged before or at the start of the hinge ribs 14.

FIG. 7 shows the airbag module 7 in the design as soft cover airbag module. The airbag 7*a* and the gas generator 7*b* are arranged in a fabric cover 15.

FIGS. 8 and 9 show further versions of the cross section A-A through the backrest 1. In contrast with the FIGS. 7 and 8, the hard cover housing 3 does not have a circumferential margin. The first longitudinal edge 3*b* rather terminates with the first upholstery foams 4 and/or adjoins the same. The complementary longitudinal edge 3*g* is omitted. The second upholstery foam section 5 adjoins the back outer surface 3*h* of the half shell 3*a*, in particular in the region of the profile wall 3*d*. In the outer region 3*i* of the hard cover housing 3, the hinge and/or weakened line 10 is introduced about which the at least one region of the hard cover housing 3 can fold. The airbag module is designed as soft cover airbag module. The airbag 7*a* and the gas generator 7*b* are arranged in the fabric cover 15.

In FIG. 9, the backrest 1 includes a fabric unfurling duct 16. In the fabric unfurling duct 16, the airbag module 7 and the hard cover housing 3 are arranged for mutual fixing. The fabric unfurling duct 16 is sewn to the backrest cover 6 in the region of the first longitudinal edge 3*b* as a result of which a visible tear-open seam 11 is formed. Upon and/or after the activation of the gas generator 7*b*, the tear-open seam 11 tears open. At the same time, at least one region of the hard cover housing 3 hinges about the hinge and/or weakened line 10. The fabric unfurling duct 16 serves in order to steer the airbag 7*a* being inflated into the correct inflation direction so that the occupant can be most effectively protected from injuries.

Figure 10:
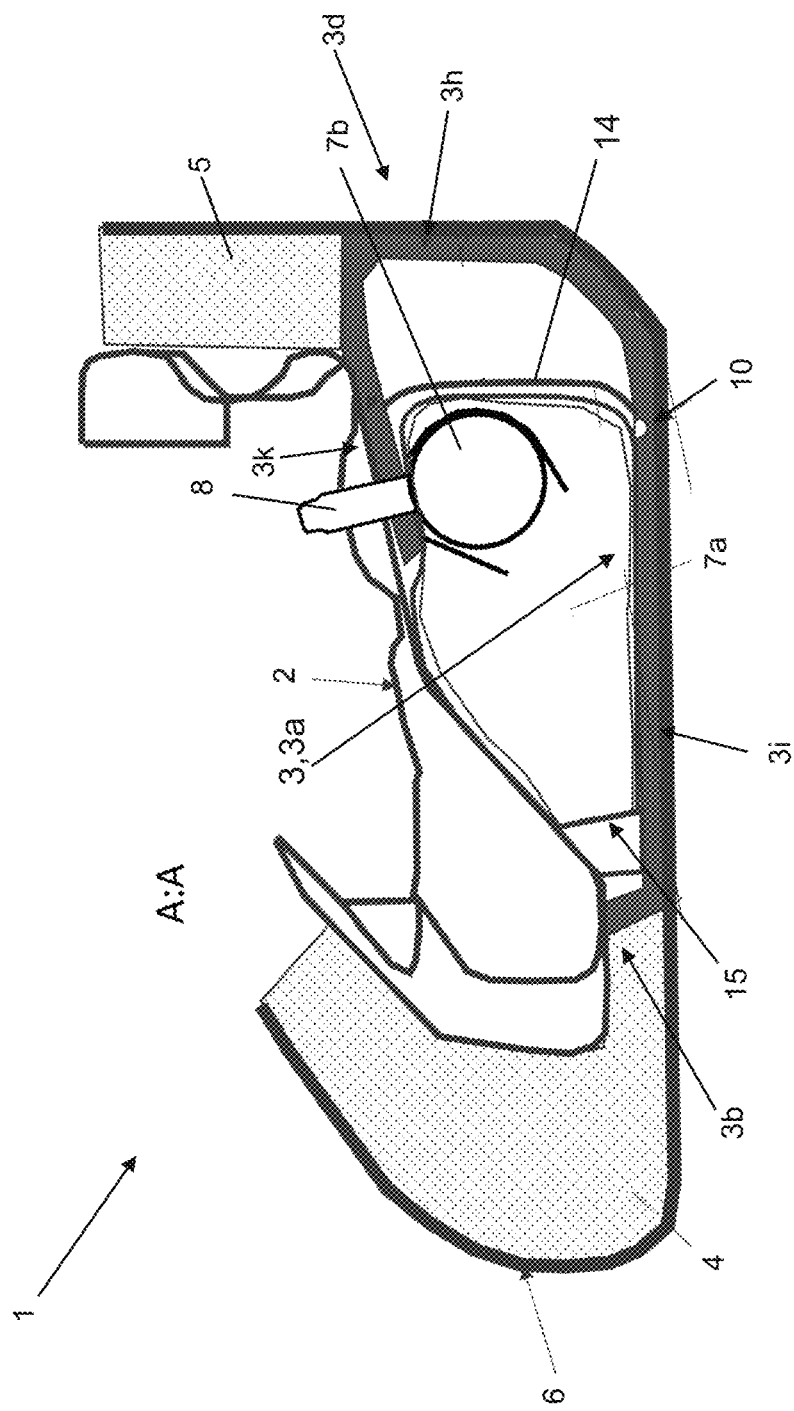
FIG. 10 shows the cross section from FIGS. 5 to 9 in a sixth version.

FIG. 10 shows yet another version of the cross section from FIG. 5 through the backrest 1 along the section line A-A. The first longitudinal edge 3*b* of the hard cover housing 3 and a marginal region of the first longitudinal edge 3*b* lie against the first upholstery foam section 4. The profile wall 3*d* is not covered by the second upholstery foam section 5 towards the back. The back outer surface 3*h* is covered by the backrest cover 6. Thus, the hard cover housing 3 is formatively designed for the backrest 1 in particular in the region of the back outer surface 3*h*. Between the airbag module 7 and the profile wall 3*d* the hinge ribs 14 are arranged. These run on the inside in the profile wall 3*d* from the region 3*k* facing the backrest side rail 2 as far as to the hinge and/or weakened line 10.

Figure 11:
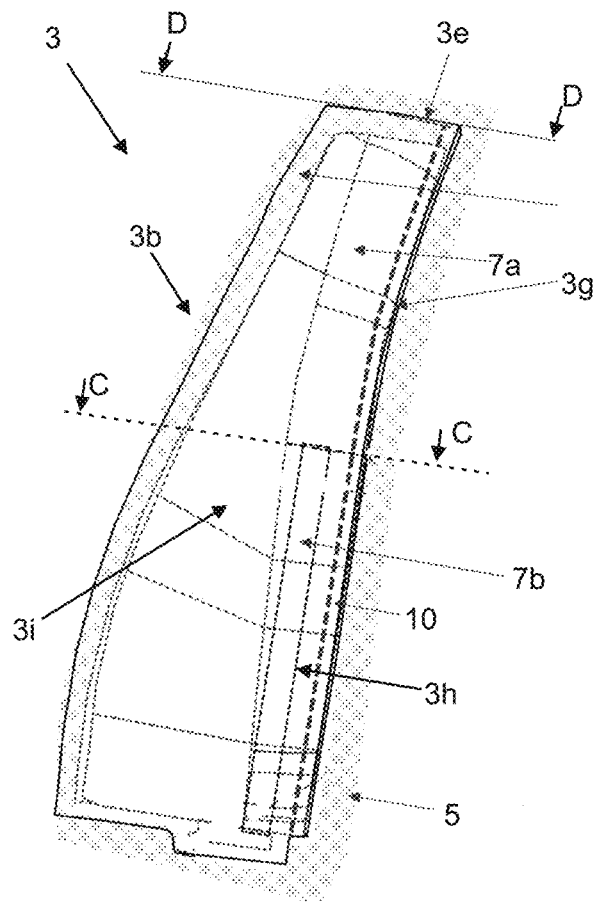
FIG. 11 shows a plan view of an external region of the hard cover housing.
Figure 12:
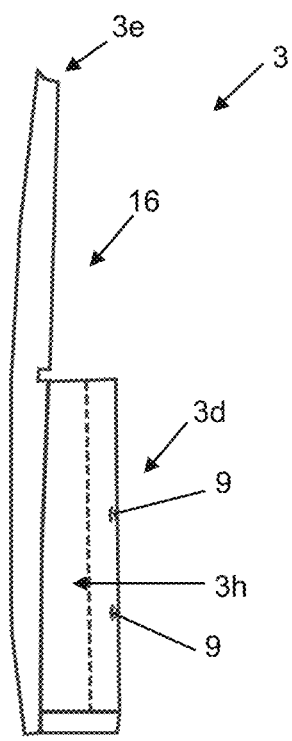
FIG. 12 shows a plan view of the profile wall of the hard cover housing.
Figure 13:
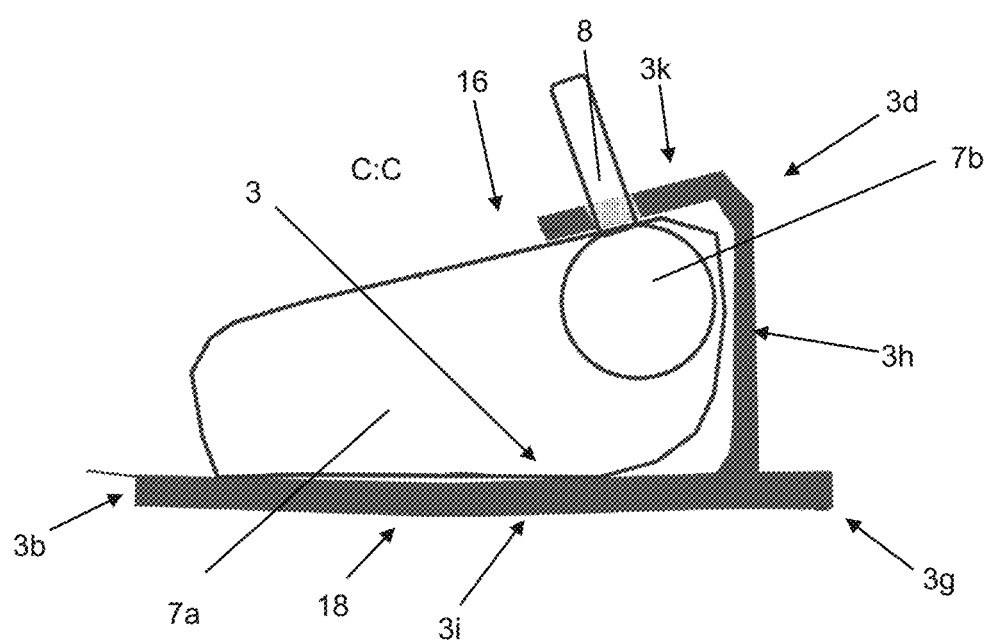
FIG. 13 shows a cross section through the hard cover housing from FIG. 11 along the section line C-C.

FIG. 11 shows the hard cover housing 3 in a plan view onto the outer region 3*i*. FIG. 12 shows the hard cover housing in a plan view from the back, in particular onto the back outer surface 3*h* of the profile wall 3*d*. In the FIG. 13, a cross section along the section line C-C through the hard cover housing 3 from FIG. 11 is shown.

The hard cover housing 3 has the circumferential margin as in the FIGS. 6 and 7. The outer region 3*i* of the half shell 3*a* runs between the first longitudinal edge 3*b* and the complementary longitudinal edge 3*g*. Said region is arranged tensioned so that a vaulting 18 of the outer region 3*i* occurs. Because of this, the airbag module 7 is pressed against the backrest side rail 2 so that it is installation space-savingly integrated in the backrest 1.

The profile wall 3*d* encloses the airbag module 7 in the region of the gas generator 7*b*. In the profile wall 3*d*, two holes 9 are arranged. Because of this it can be ensured that the hard cover housing 3 can be variably employed for different airbag module versions. In particular, the hard cover housing 3 can be attached to the backrest side rail 2 jointly with airbag modules in different configurations and sizes.

Directed towards the region 3*k* (see in particular FIG. 12) facing the backrest side rail 2 the hard cover housing 3 has an open wall 16. Thus, material can be saved and the weight of the hard cover housing 3 reduced.

Figure 14:
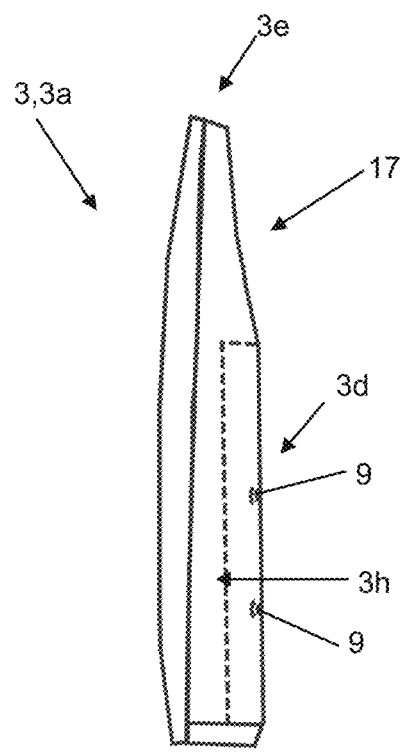
FIG. 14 shows an alternative plan view of the profile wall of the hard cover housing to that from FIG. 12.
Figure 15:
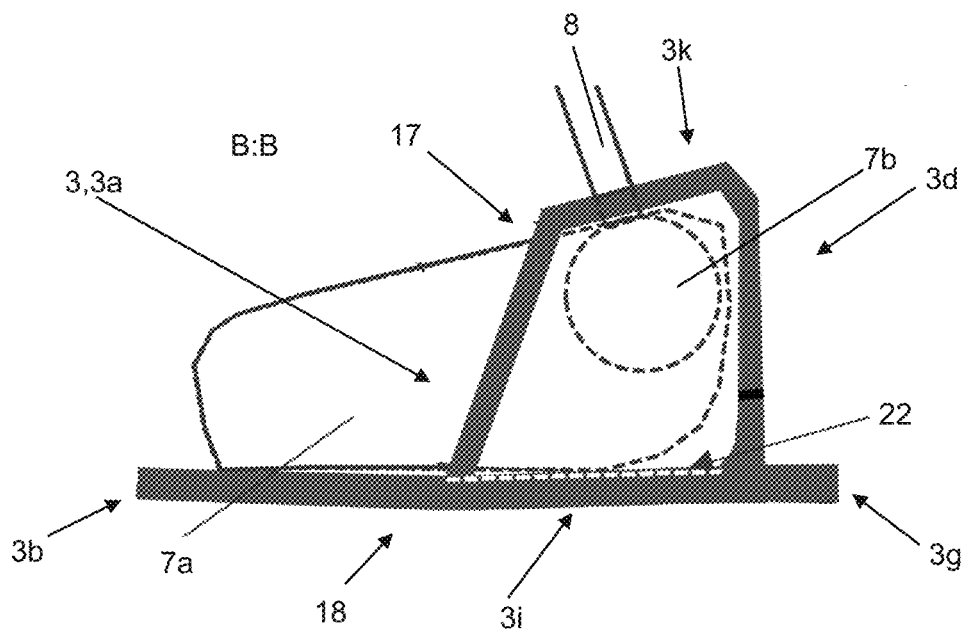
FIG. 15 shows a cross section through the hard cover housing from FIG. 2 along the section line B-B.

FIG. 14 shows a modified cross section along the section line C-C through the hard cover housing 3 from FIG. 11. In FIG. 15, a modified cross section along the section line B-B through the hard cover housing 3 from FIG. 2 is shown. In the region 3*k* facing the backrest side rail 2, the hard cover housing 3 has a wall 17 which is at least partly, for example at least two-thirds closed. Optionally, the closed wall 17 can be continuous, slit, partly or completely separated. The tear-open line 22 runs in the outer region 3*i*, along which the hard cover housing 3 can tear open in order to form the opening for the airbag 7*a* being inflated.

In FIG. 16, a cross section along the section line B-B from FIG. 2 through the first front edge 3*e* of the hard cover housing 3 is shown. The hard cover housing 3 is designed foldable so that at least one region can be folded open and closed along the further hinge and/or weakened line 10 or multiple regions of the hard cover housing 3 can be folded open and closed along the further hinge and/or weakened line. Because of this, an installation of the hard cover housing 3 in the backrest 2 can be simplified. Likewise, an injection mound in which the hard cover housing 3 is produced, can be configured simpler and more cost-effectively. In particular, introducing expensive undercuts in the mound can be omitted.

On the first front edge 3e and optionally complementarily on the second front edge 3f, the front surface 23 is arranged which closes the front edge(s) 3e, 3f. The hard cover housing 3 has at least one latching device 19 which is arranged on the front face 23 of the first edge 3e and optionally complementarily on the front face 23 of the second front edge 3f. Because of the latching device 19, the region 3k of the profile wall 3d facing the backrest side rail 2 and the outer region 3i of the hard cover housing 3 can be mutually latched to one another.

Figure 17:
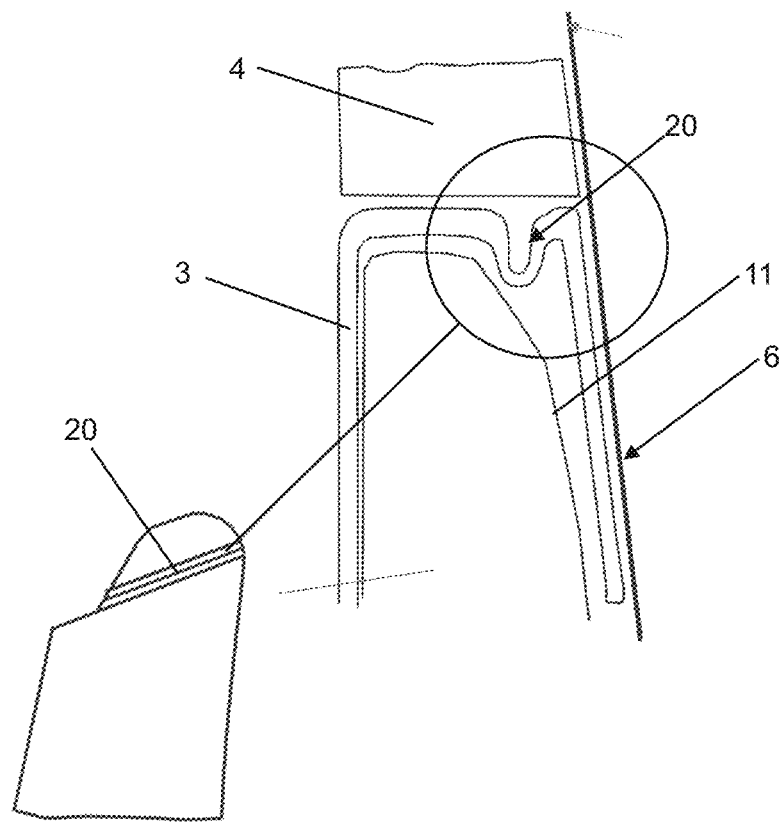
FIG. 17 shows a longitudinal section along the section line B-B from FIG. 2 through the first front edge and through the outer region of the hard cover housing with a tolerance and/or length compensation strap.
Figure 18:
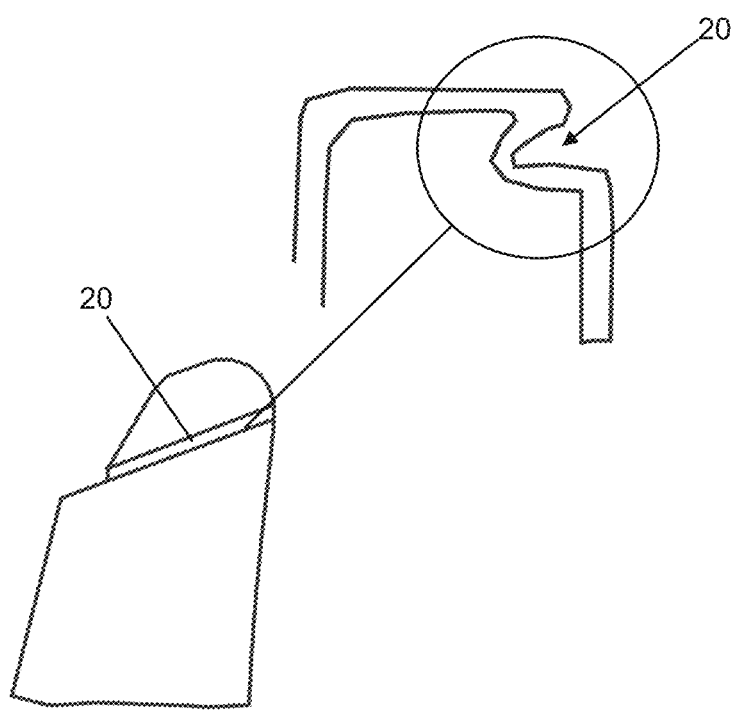
FIG. 18 shows an alternative arrangement of the tolerance and/or length compensation strap from FIG. 17.

FIG. 17 shows a longitudinal section along the section line B-B from FIG. 2 through the first front edge 3e of the hard cover housing 3. At the transition between the first front edge 3e and the region 3k directed towards the backrest side rail 2 a tolerance and/or length compensation strap 20 is introduced. The same is arranged where the hard cover housing 3 can fold along the at least one hinge and/or weakened line 10. Optionally, the tolerance and/or length compensation 20 is arranged adjacent to the tear-open seam 11 and/or combined with the same. The backrest cover 6 presses the back outer surface 3h against the profile wall 3d. Through the tolerance and/or length compensation strap 20, tolerances and lengths can be adapted during the integration of the hard cover housing 3 into the backrest 1. FIG. 18 shows an alternative arrangement of the tolerance and/or length compensation strap 20 of the hard cover housing 3.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A backrest for a vehicle seat comprising:
   a backrest side rail configured to support a side of a seat occupant;
   a hard cover housing having a half shell in a lateral plan view arranged in a region along a longitudinal extent of the backrest side rail with a first longitudinal edge and a second longitudinal edge spaced from the first longitudinal edge; and
   an airbag module with modular components positioned in between the two longitudinal edges, wherein the modular components include an airbag and a gas generator, wherein the hard cover housing is tensioned to press the airbag against the backrest side rail.

2. The backrest according to claim 1, wherein the half shell comprises a profile wall including the second longitudinal edge such that the modular components are at least partially surrounded by the profile wall.

3. The backrest according to claim 2, wherein the half shell further comprises a first front edge, a second front edge and at least one front face, wherein the at least one front face closes at least one of the front edges.

4. The backrest according to claim 1, wherein the hard cover housing defines a contour complementary to a geometry of the region of the backrest side rail.

5. The backrest according to claim 1, further comprising a preassembled unit including the airbag module and the hard cover housing attached in the region along a longitudinal extent of the backrest side rail.

6. The backrest according to claim 1, wherein the airbag module further comprises a fabric cover, wherein the hard cover housing is attached to the backrest side rail and the modular components are arranged in the fabric cover which together are positioned in between the longitudinal edges of the half shell.

7. The backrest according to claim 6, wherein the airbag module further comprises at least one fastener attaching the hard cover housing to the backrest side rail adjacent to the second longitudinal edge.

8. The backrest according to claim 7, wherein the at least one fastener comprises a pin of the gas generator.

9. The backrest according to claim 1, wherein the hard cover housing further comprises a structural feature subdividing the hard cover housing into at least two regions, such that at least one of the two regions can be folded about the structural feature.

10. The backrest according to claim 9, wherein the structural feature comprises at least one of a hinge or a weakened line.

11. The backrest according to claim 1, further comprising a form-fitting connection between the hard cover housing and the backrest side rail, wherein the form-fit connection is disconnectable.

12. The backrest according to claim 1, wherein the hard cover housing further comprises a tear-open line along the first longitudinal edge.

13. The backrest according to claim 1, further comprises:
   first and second backrest side rail margins on wherein the backrest side rail in a lateral plan view; and
   an upholstery foam including a first foam section over molded on the first backrest side rail margin and a second foam section over molded on the second backrest side rail margin, wherein the first foam section includes a mounting for the first longitudinal edge of the half shell.

14. The backrest according to claim 13, wherein the first longitudinal edge of the half shell is held in the mounting in a form-fit manner.

15. A vehicle seat comprising a seat bottom and the backrest according to claim 1.

* * * * *